(12) United States Patent  (10) Patent No.: US 8,868,260 B2
Zarrella et al.  (45) Date of Patent: Oct. 21, 2014

(54) CONSOLIDATED VEHICLE PROPULSION CONTROL USING INTEGRATED MODULAR AVIONICS

(71) Applicant: Honeywell International Inc., Morristown, NJ (US)

(72) Inventors: Joseph Anthony Zarrella, Palm Harbor, FL (US); Mitch Fletcher, Glendale, AZ (US); Gordon Collyer, Culpeper, VA (US); Richard Willis, Largo, FL (US); Pat Resing, Seminole, FL (US)

(73) Assignee: Honeywell International Inc., Morristown, NJ (US)

( * ) Notice: Subject to any disclaimer, the term of this patent is extended or adjusted under 35 U.S.C. 154(b) by 14 days.

(21) Appl. No.: 13/666,565

(22) Filed: Nov. 1, 2012

(65) Prior Publication Data

US 2014/0121862 A1   May 1, 2014

(51) Int. Cl.
*B64C 19/00* (2006.01)
*G01C 23/00* (2006.01)
*G05D 1/00* (2006.01)
*G05D 3/00* (2006.01)

(52) U.S. Cl.
CPC ...................................... *B64C 19/00* (2013.01)
USPC .......................................................... 701/3

(58) Field of Classification Search
CPC ............ B64G 1/00; B06F 13/00; B64C 19/00
USPC .......................................................... 701/3
See application file for complete search history.

(56) References Cited

U.S. PATENT DOCUMENTS

| 4,195,611 | A | 4/1980 | Worz et al. |
| 6,298,289 | B1 | 10/2001 | Lloyd et al. |
| 6,424,891 | B1 | 7/2002 | Sargent et al. |
| 2007/0239912 | A1 * | 10/2007 | Fletcher et al. ............... 710/104 |
| 2009/0140101 | A1 | 6/2009 | Salkeld |

FOREIGN PATENT DOCUMENTS

| EP | 2244190 A1 * | 10/2010 | ............. G06F 13/40 |
| JP | 2003254160 | 9/2003 | |
| JP | 2008100657 | 5/2008 | |

* cited by examiner

*Primary Examiner* — Mary Cheung
*Assistant Examiner* — Anne Mazzara
(74) *Attorney, Agent, or Firm* — Ingrassia Fisher & Lorenz, P.C.

(57) ABSTRACT

A vehicle is provided. The vehicle may include, but is not limited to, a virtual backplane, a vehicle management computer communicatively coupled to the first virtual backplane and having a first predetermined schedule, a consolidated propulsion controller communicatively coupled to the virtual backplane and having a second predetermined schedule different from the first predetermined schedule, at least one engine communicatively coupled to the first virtual backplane, each of the at least one engines having a unique schedule, and at least one control system communicatively coupled to the first virtual backplane, each of the at least one control systems having a unique schedule, wherein each of the vehicle management computer, consolidated propulsion controller, at least one engines and at least one control system are configured to add and consume date from the virtual backplane according to their respective schedules.

17 Claims, 4 Drawing Sheets

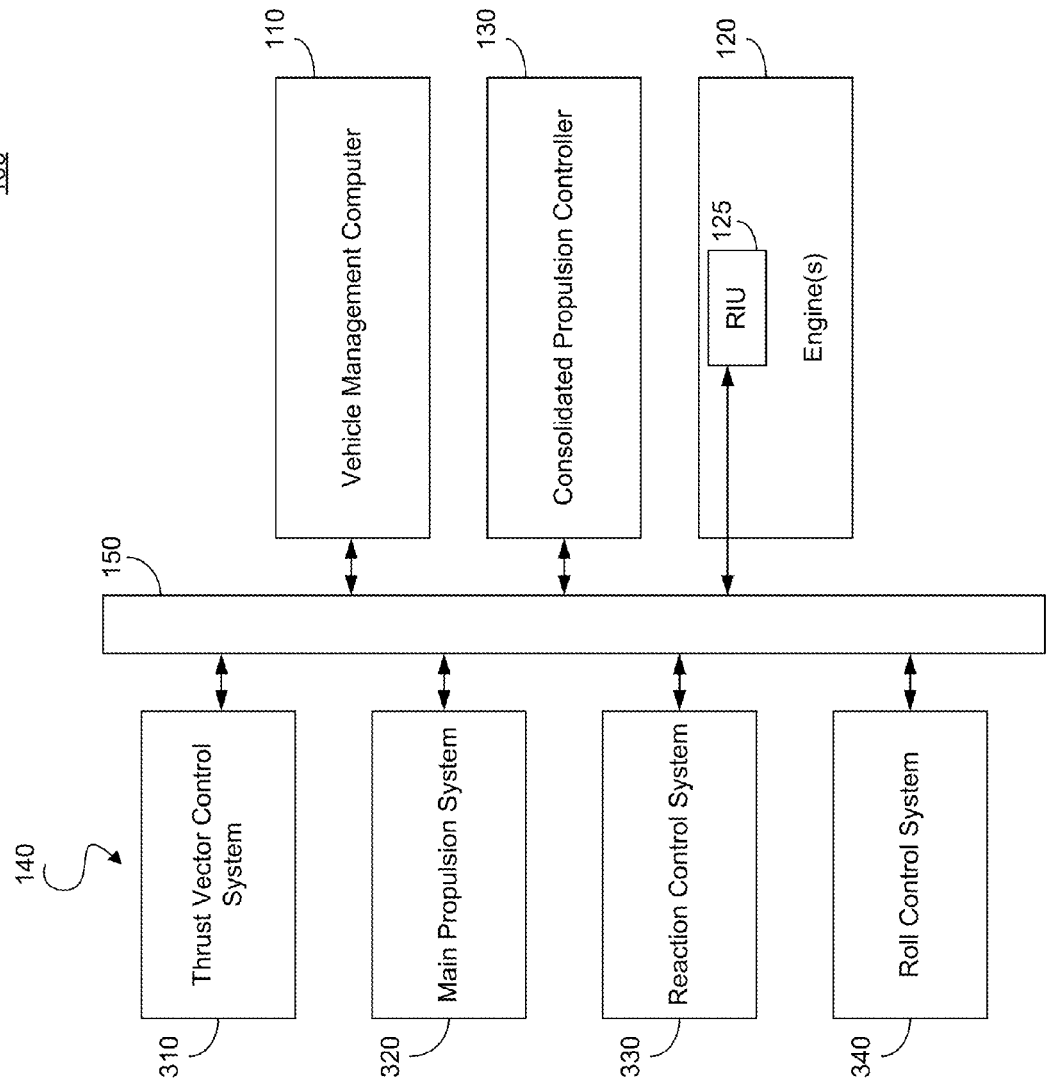

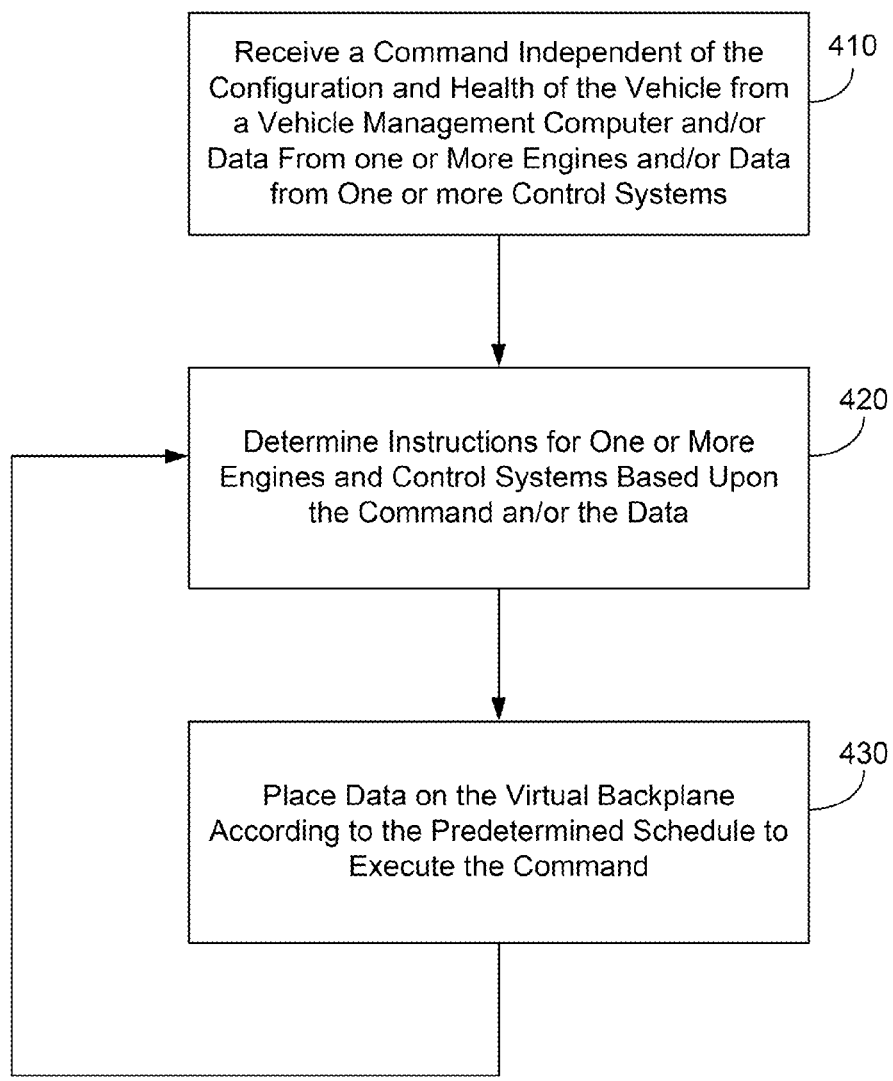

CONSOLIDATED VEHICLE PROPULSION CONTROL USING INTEGRATED MODULAR AVIONICS

TECHNICAL FIELD

The following relates to vehicles, and more particularly to systems and methods for controlling a rocket, spacecraft or missile using a consolidated propulsion controller.

BACKGROUND

Rockets and spacecraft are complicated and expensive vehicles with many components. Typically, each engine and each propulsion subsystem in the vehicle has its own control system. When a main flight computer for the rocket or spacecraft wants to issue a command to, for example, create thrust, the main flight computer issues a command to a control system for each engine and propulsion subsystem. Accordingly, every time a component on the rocket or spacecraft is modified, added or removed, the entire main flight computer system has to be updated to take into account the changes.

SUMMARY

In accordance with one embodiment, a vehicle is provided. The vehicle may include, but is not limited to, a first virtual backplane, a vehicle management computer communicatively coupled to the first virtual backplane and having a first predetermined schedule, wherein the vehicle management computer is configured to add and consume data from the first virtual backplane according to the first predetermined schedule, a consolidated propulsion controller communicatively coupled to the first virtual backplane and having a second predetermined schedule different from the first predetermined schedule, wherein the consolidated propulsion controller is configured to add and consume data from the first virtual backplane according to the second predetermined schedule, at least one engine communicatively coupled to the first virtual backplane, each of the at least one engines having a unique schedule, wherein each of the at least one engines is configured to add and consume data from the first virtual backplane according to a respective unique schedule, and at least one control system communicatively coupled to the first virtual backplane, each of the at least one control systems having a unique schedule, wherein each of the at least one control systems is configured to add and consume data from the first virtual backplane according to a respective unique schedule.

In accordance with another embodiment, a spacecraft having at least one engine is provided. The spacecraft may include, but is not limited to, a first virtual backplane, a vehicle management computer communicatively coupled to the virtual backplane and having a first predetermined schedule, wherein the vehicle management computer is configured to add and consume data from the virtual backplane according to the first predetermined schedule, a remote interface unit communicatively coupled to the at least one engine and configured to control the engines, wherein the remote interface unit comprises at least one sensor for monitoring a health of the engine, wherein the remote interface unit is communicatively coupled to the virtual backplane and has a second predetermined schedule, wherein the remote interface unit is configured to add and consume data from the first virtual backplane according to the first predetermined schedule, a consolidated propulsion controller communicatively coupled to the virtual backplane and having a third predetermined schedule different from the first and second predetermined schedules, wherein the consolidated propulsion controller is configured to add and consume data from the virtual backplane according to the third predetermined schedule, and at least one control system communicatively coupled to the virtual backplane, each of the at least one control systems having a unique schedule, wherein each of the at least one control systems is configured to add and consume data from the first virtual backplane according to a respective unique schedule.

In accordance with yet another embodiment, a method for controlling vehicle having a main flight computer and at least one engine is provided. The method may include, but is not limited to, receiving, by a consolidated propulsion controller, a flight command from the main flight computer via a virtual backplane, wherein the flight command is independent of the state and configuration of the vehicle, determining, by the consolidated propulsion controller, instructions for the at least one engine and for at least one control system on the vehicle to execute the flight command, and adding, by the consolidated propulsion controller, instructions for the at least one engine and for the at least one control system on the virtual backplane according to a predetermined schedule.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWING FIGURES

Exemplary embodiments will hereinafter be described in conjunction with the following drawing figures, wherein like numerals denote like elements.

FIG. 3 is a flow chart illustrating an exemplary method for controlling a propulsion control system, in accordance with an embodiment; and FIG. 4 is a flow chart illustrating an exemplary method for controlling a vehicle, in accordance with an embodiment.

DETAILED DESCRIPTION

According to various exemplary embodiments, a vehicle having a consolidated propulsion controller is provided. The consolidated propulsion controller may be coupled to various subsystems within a propulsion control system via a virtual backplane. The consolidated propulsion controller may receive commands independent of the number of engines, state or configuration of the engines, and the state or configuration of the various subsystems within a propulsion control system. The consolidated propulsion controller adds data to the virtual backplane for the engines and various subsystems within a propulsion control system to consume in order to collectively execute the command.

Figure 1:
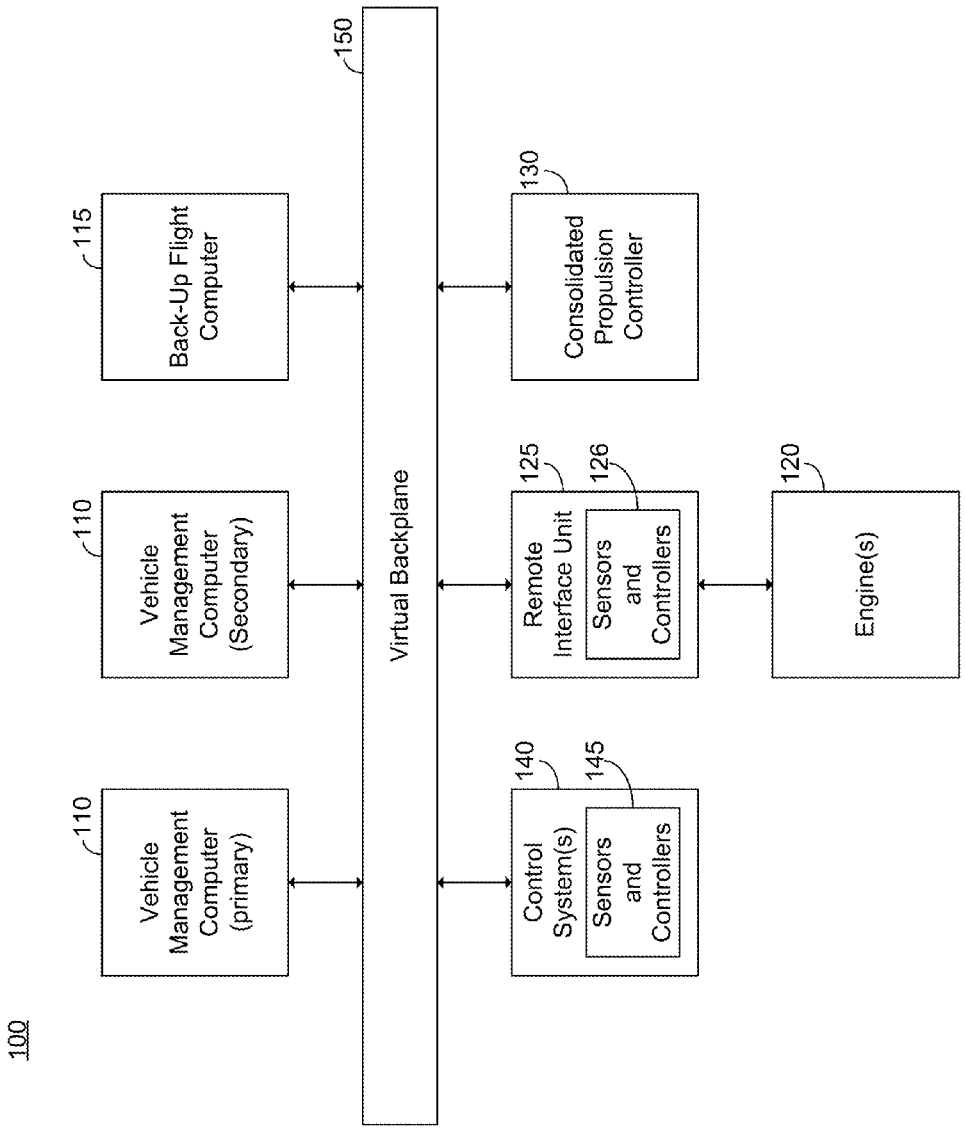
FIG. 1 is a block diagram of a vehicle, in accordance with an embodiment.

FIG. 1 is a block diagram of a vehicle 100, in accordance with an embodiment. The vehicle 100 could be any rocket, spacecraft, missile, aircraft, or the like. The vehicle includes at least one vehicle management computer 110. The vehicle management computer 110 may include a processor and may function as the main flight computer for the vehicle 100. The functions of the vehicle management computer may include one or more input function, such as accepting vehicle commands or a ground support interface, and one or more output functions, such as outputting thrust and vector instructions, as discussed in further detail below. In one embodiment, for example, the vehicle 100 may include a second or multitude of vehicle management computer(s) 110 as a fully functional back-up for the first vehicle management computer 110. Furthermore, the vehicle 100 may also include a dissimilar back-up flight computer 115 as a back-up to the one or more vehicle management computers in the vehicle 100. The backup flight 115 computer may or may not have reduced function. The backup flight computer 115 may be dissimilar in either hardware or software.

The vehicle 100 also includes one or more engines 120 which are capable of providing thrust for the vehicle. The engine(s) 120 may vary depending upon the vehicle. A rocket engine, for example, produces thrust by the expulsion of a high-speed fluid exhaust. In one embodiment, for example, the fluid may be a gas which is created by high pressure combustion of solid or liquid propellants, consisting of fuel and oxidizer components, within a combustion chamber. Each engine 120 includes a remote interface unit 125 which provides a communication link between the engine and the other systems in the vehicle 100. The engine(s) 120, may use, for examples, liquid or solid fuels, or a combination thereof. In one embodiment, for example, liquid oxygen and liquid hydrogen may be used to provide thrust. In other embodiments, liquid methane and liquid oxygen may be used. The engine(s) 120 may be fixed to the vehicle and/or detachable for the vehicle (e.g., booster rockets). The RIU 125 may include one or more sensors or controllers 126. The sensors and control systems may include, but are not limited to, spark igniters, control propellant valves, control pneumatic valves, control discrete valves, sensors, thrust vector actuator drives, pitch and roll actuator drives, tank pressure actuators and tank and line heaters.

The vehicle further includes a consolidated propulsion controller 130 for creating instructions for controlling the thrust, thrust vectoring, yaw, pitch, rotation and tankage for the vehicle. In one embodiment, for example, the consolidated propulsion controller 130 may be an independent processor, such as a central processing unit (CPU), or any other type of processor or state machine. In this embodiment, for example, the vehicle may include a second consolidated propulsion controller 130 as a back-up for the first consolidated propulsion controller 130. In another embodiment, for example, the consolidated propulsion controller 130 may be implemented using the vehicle management computer 110. In this embodiment, for example, the vehicle management computer 110 may include a time and space partition. Accordingly the functionality of the consolidated propulsion controller 130 can be isolated from the other functions of the vehicle management computer 110. In one embodiment, for example, the certain functions of the vehicle can be arbitrarily assigned to either the vehicle management computer 110 or the consolidated propulsion controller 130. The functions could also be reassigned over time. In another embodiment, for example, certain functions may be assigned to both the vehicle management computer 110 and the consolidated propulsion controller 130 so that the vehicle management computer 110 and the consolidated propulsion controller 130 act as redundant systems.

The consolidated propulsion controller 130 has the ability to perform the functions including, but not limited to, accept vehicle commands, provide a ground support interface, control spark igniters, control propellant valves, control discrete (on/off) valves, control sensor excitation thrust vector actuator drive, control pitch & roll actuator drive, control pressure actuators, control tank & line heaters, control an igniter state, measure tank and line temperature and pressure, measure fuel/oxidizer flow rate, measure linear valve position, measure rotary valve position, measure propellant level, measure turbo pump vibration, measure thrust vector position, control a valve position, perform engine control translation, perform sensor data translation, perform a mixture ratio control law position calculation, perform propulsion system situational awareness, control valves & igniter drivers, control thrust vector control law, monitor propulsion system health management, control vibration monitor control law, perform controller Built-In Test (BIT), control digital status/data telemetry, control analog vibration telemetry, and/or provide a ground support interface.

The vehicle further includes one or more control systems 140. The control systems 140 includes the mechanisms that allow the consolidated propulsion controller 130 to control the thrust, thrust vectoring, yaw, pitch, rotation and tankage for the vehicle. In one embodiment, for example, the control systems 140 may include a thrust vector control system, a main propulsion system, a reaction control system and a roll control system, as discussed in further detail below. Each of the control systems 140 may have one or more sensors or controllers 145 to control a state of the control system 140 or to monitor a health of the control system 140.

The vehicle 100 may utilize an integrated modular avionics system. The vehicle management computer 110, engines 120 (via their respective RIU's 125), consolidated propulsion controller 130, and control systems 140 may each be thought of as a node in the integrated modular avionics system. Each node may be communicatively coupled via a virtual backplane 150. Each node has a schedule, which may be stored, for example in a table in a memory (not illustrated) on the vehicle 100. Each node in the vehicle 100 independently adds data to the virtual backplane 150 and consumes data from the virtual backplane 150 according to its respective schedule. Accordingly, there is no need to issue commands, send addresses, or receipt confirmations to the virtual backplane 150 since each node knows when to add or consume data from the virtual backplane 150 according to its respective schedule. Therefore, the amount of data that can pass though the virtual backplane 150 can be increased relative to another type of bus where commands, addresses and/or receipt confirmations are necessary. Furthermore, nodes can be added or removed from the vehicle 100 depending upon the needs of a particular vehicle. For example, engines 120 may be added or removed from the vehicle 100 depending upon the lifting needs for a particular mission. The schedule for each node in the vehicle 100 simply has to be updated to accommodate a newly added or removed node. Furthermore, the integrated modular avionics system acts like each node exists in the same box even though each node can be located at a different part of the vehicle, can be independent of all other nodes, can be combined with any other node in the system, or moved to different locations in the vehicle. The virtual backplane 150 can be implemented, for example, via a time-triggered Ethernet (TTE) bus, a safe bus, a pci-express bus, a firewire bus, or any other type of bus and one or more switches, as illustrated in FIG. 2.

Figure 2:
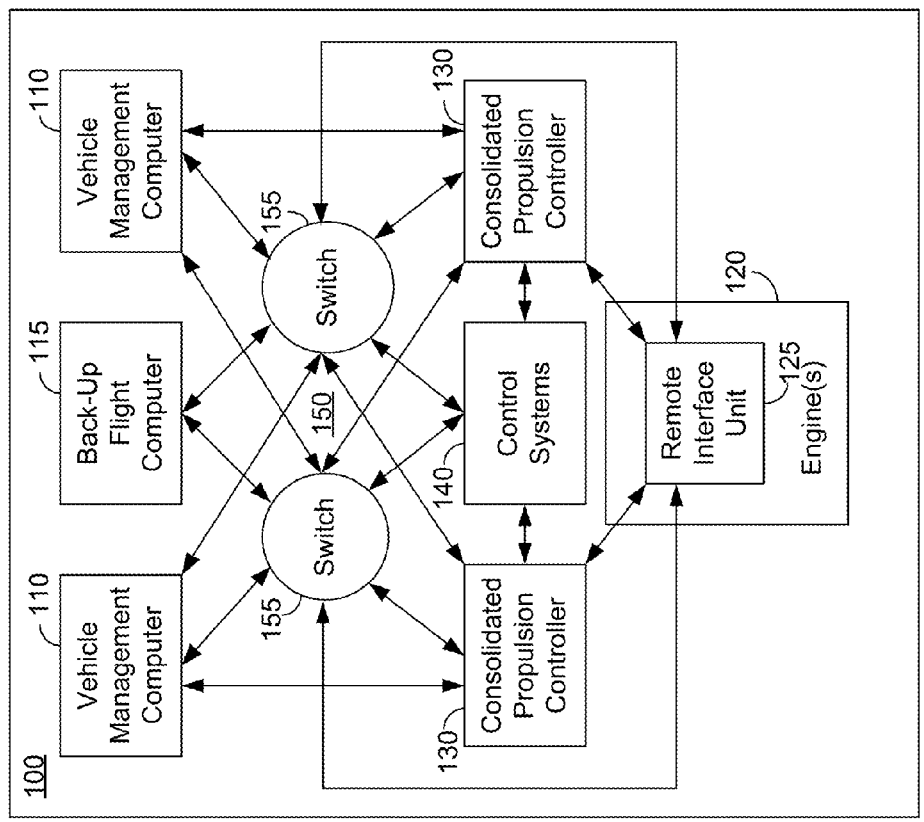
FIG. 2 is a block diagram illustrating an exemplary propulsion control system for a vehicle, in accordance with an embodiment.

FIG. 2 illustrates a block diagram of another exemplary vehicle 100 in accordance with an embodiment. As seen in FIG. 2, the vehicle 100 includes two switches 155. Each switch 155 implements a virtual backplane and provides a communication path between any of the vehicle management computer(s) 110, back-up flight computer 115, Engine(s) 120, consolidated propulsion controller(s) 130 and control systems 140. The second switch 155 implementing the second virtual backplane may be used as a backup virtual backplane in case the first virtual backplane fails. In one embodiment, for example, each node in the vehicle may attempt to read data from a first virtual backplane according to the node's respective schedule and, only if there is no data on the first virtual backplane, the respective node may then attempt to retrieve data from the second virtual backplane. In another embodiment, for example, the second virtual backplane may be used to create a fault tolerant system for the vehicle 100. The fault tolerant system could be based upon a voting system where each node in the system adds to both virtual backplanes 150 and consume data from both virtual backplanes. In this embodiment, for example, the consolidated propulsion controller 130 may also have a direct communication path to each node implemented via one or more of the virtual backplanes. In one embodiment, for example, the direct path may be implemented by one of the switches 155. Accordingly, in a voting fault tolerant system, if the data along at least two of the paths agree with each other, the agreed data is assumed to be true. In another embodiment, the vehicle 100 may use a fail passive system. In a fail passive system no bad data ever exists in the system. In other words, if an error is detected in the system, that no data is added to the virtual backplane. In one embodiment, for example, when error messages are generated, the state of the vehicle remains unchanged. Accordingly, if there is data present on the virtual backplane 150 when one of the nodes attempts to consume data according to a respective schedule, the node can assume that the data is valid.

FIG. 3 is a block diagram illustrating another exemplary vehicle 100, in accordance with an embodiment. The vehicle 100 includes a vehicle management computer 110, at least one engine 120, each engine having a remote interface unit 125, a consolidated propulsion controller 130 and a series of control systems 140 communicatively coupled via a virtual backplane 150.

The control systems 140 include a thrust vector control system 310. The consolidated propulsion controller 130 can control the thrust vector control system 310 to manipulate the direction of the thrust provided by the engine(s) 120 to control the attitude or angular velocity of the vehicle. In one embodiment, for example, the consolidated propulsion controller 130 may post instructions to the virtual backplane 150 to cause the thrust vector control system 310 to gimbal one or more of the engines 120 to control a direction of thrust. In some rockets, for example, the combustion chamber, exhaust, and/or engine assembly (including fuel and oxidizer pumps) may be moved. In other embodiments, for example, a combustible fluid may be introduced into an exhaust of one or more of the engines 120. If the combustible liquid is only introduced on one side of an engine 120, the combustible liquid modifies the respective side of the exhaust plume, resulting in a different thrust on the respective side of the engine 120 and an asymmetrical net force on the rocket, spacecraft or missile. In yet other embodiments, for example, the consolidated propulsion controller 130 may instruct the thrust vector control system 310 to deflect an exhaust (not shown) of one or more of the engines 120. The exhaust may be deflected, for example, using servomechanisms or hydraulic cylinders.

The control systems 140 further include a main propulsion system 320. The main propulsion system 320 controls a tankage of the vehicle 100 and may include subsystems to control pressure in fuel or oxidizer tanks, a slosh control system for controlling slosh in the fuel or oxidizer tanks, a temperature control system to control a temperature of a fuel or oxidizer, a valve control system for permitting a flow of fuel or oxidizer to an engine 120 and/or and pump control system to control an amount of fuel and/or oxidizer flowing from a respective tank to an engine 120. The main propulsion system 320 can add data, for example, temperature, pressure, valve and pump data, to the virtual backplane 150. The consolidated propulsion controller 130 can consume the data from the virtual backplane 150 according to its unique schedule and issues commands via data posts to the virtual backplane 150 to optimize the amount of thrust per pound of fuel used by the vehicle based upon the consumed data.

The control systems 140 further include a reaction control system 330 and a roll control system 340. The consolidated propulsion controller 130 may direct a reaction control system 330 and a roll control system 340 to control a yaw, pitch and roll of the vehicle. In one embodiment, for example, the reaction control system 330 and roll control system 340 may use thrusters mounted on the vehicle. The thrusters may be placed at various locations along the vehicle 100.

As discussed above, the consolidated propulsion controller 130 is independent of the vehicle management computer 110, either by being a separate processor, or by being in a time and space partition within the vehicle management computer 110, as discussed above. When the vehicle management computer 110 wants the vehicle to move in a particular direction (i.e., take off, change direction, rotate, etc), the vehicle management computer 110 sends a command to the consolidated propulsion controller 130. The command sent by the vehicle management computer 110 is independent of the nodes within the vehicle 100. In other words, the command would be the same regardless if the vehicle included three engines, five engines, different reaction or roll control systems, different fuels, the health of each of the systems or any other variation in the vehicle 100. The consolidated propulsion controller 130 processes the command and issues instructions to the engine(s) 120, the thrust vector control system 310, the reaction control system 330 and/or the roll control system 340, as is appropriate for the given command, by placing data onto the virtual backplane 150 according to the predetermined schedule while also monitoring and controlling the tankage for the vehicle via the main propulsion system 320.

Accordingly, one benefit of using a consolidated propulsion controller is that configuration of the vehicle can be changed without having to make any changes to the main flight computer of the vehicle, for example, the vehicle management computer 110. In other words, the type or number of engines can be changed, without requiring any changes to the main flight computer. Furthermore, since the vehicle 100 utilizes a consolidated propulsion controller 130 and a virtual backplane 150, no additional processing hardware is needed when nodes are added to the system.

FIG. 4 is a flow chart illustrating an exemplary method 400 for controlling a vehicle, in accordance with an embodiment. The method begins when a consolidated propulsion controller, such as the consolidated propulsion controller 130 illustrated in FIGS. 1-3, receives a flight command from a main flight computer of a vehicle, such as the vehicle management computer 110 illustrated in FIGS. 1-3. (Step 410). The command is independent of the vehicle configuration, the health of any of the nodes in the vehicle, and the current state of any of the nodes in the vehicle. One exemplary command may be, for example, a command requesting thrust of a particular magnitude in a particular vector or direction.

The consolidated propulsion controller then determines the instructions for one or more engines and control systems to execute the command based upon the configuration of vehicle and the current state and health of the engines and control systems. (Step 420). For example, the instruction to produce a particular amount of thrust may be dependent upon the weight of the vehicle. One component of the weight of the vehicle is the amount of fuel and oxidizer in the respective tanks As discussed above, a main propulsion system may place data on a virtual backplane indicating the status of the tankage of the vehicle according to the predetermined schedule. Accordingly, the consolidated propulsion controller can consume data from the virtual backplane at the appropriate time based upon the schedule to learn the current tankage status for the vehicle so that the weight of the fuel and oxidizer in the vehicle can be accounted for when calculating how much thrust to provide to meet the command request. The consolidated propulsion controller also takes into account a configuration of the engines and control systems. For example, the consolidated propulsion controller can take into account the number of engines on the vehicle, the type engines, and an amount of thrust capable of being generated by any combination of the engines in the vehicle. Furthermore, the consolidated propulsion controller can also take into account the health of each node in the system. For example, the consolidated propulsion controller can take into account a temperature of an engine, a blocked valve or pump, or any other aspect of the health of the overall system when generating the instructions. Step 420 may also include modifying the instructions. The control systems and RIU, as discussed above, add health and state data to the virtual backplane based upon their predetermined schedules. The consolidated propulsion controller can consume the data according to the schedule and create modified instructions for each of the nodes in the system based upon the state and configuration of the nodes in order to continue carrying out the flight command sent by the vehicle management computer.

The consolidated propulsion controller then places data on a virtual backplane, such as the virtual backplane 150 illustrated in FIGS. 1-3, based upon a predetermined schedule such that the command is executed. (Step 430). As discussed above, each node in the propulsion control system has a schedule for when to add data and when to retrieve data from the virtual backplane. In one embodiment, for example, each node operates on a fixed clock. The sample speed of each node may be dependent on a control law, a control bandwidth, and a stability of the control law and of the vehicle it is controlling. One of ordinary skill in the art would recognize that the clock synchronization can happen in many ways. Accordingly, a consolidated propulsion controller can add data to a virtual backplane according to the schedule such that each node in the vehicle consumes the data and takes the appropriate action to collectively execute the command.

The method then returns to step 420 where the consolidated propulsion controller continuously monitors the state of the propulsion control system to ensure the command is followed. For example, if a valve supplying fuel to one of several engines in the vehicle becomes partially stuck, reducing the amount of fuel supplied to the engine, the temperature of the engine will rise unless the amount of oxidizer to the engine is also reduced. The main propulsion system may add data to the virtual backplane indicating a state of the valve. Furthermore, a remote interface unit for the affected engine may add data corresponding to the temperature of the engine to the virtual backplane. The consolidated propulsion controller may consume the data on the virtual backplane according to the schedule, analyze the data, and add data to the virtual backplane instructing the main propulsion system to reduce the amount of oxidizer flowing to the affected engine to stabilize the temperature in the engine. Furthermore, the consolidated propulsion controller can add data to the virtual backplane instructing the main propulsion system and the non-affected engines to increase their thrust to compensate for the engine worked at a reduced capacity. Since the thrust produced by the various engines was changed, a vector of the thrust will change. Accordingly, the consolidated propulsion controller can also instruct a thrust vector controller to gimbal the engines, for example, compensate for the change in the vector of the thrust.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the embodiments in any way. To the contrary, various changes may be made in the function and arrangement of the various features described herein without departing from the scope of the claims and their legal equivalents.

What is claimed is:

1. A vehicle, comprising:
a first virtual backplane;
a vehicle management computer communicatively coupled to the first virtual backplane and having a first predetermined schedule, wherein the vehicle management computer is configured to add and consume data from the first virtual backplane according to the first predetermined schedule;
a consolidated propulsion controller communicatively coupled to the first virtual backplane and having a second predetermined schedule different from the first predetermined schedule, wherein the consolidated propulsion controller is configured to add and consume data from the first virtual backplane according to the second predetermined schedule;
at least one engine communicatively coupled to the first virtual backplane, each of the at least one engines having a unique schedule, wherein each of the at least one engines is configured to add and consume data from the first virtual backplane according to a respective unique schedule; and
at least one control system communicatively coupled to the first virtual backplane, each of the at least one control systems having a unique schedule, wherein each of the at least one control systems is configured to add and consume data from the first virtual backplane according to a respective unique schedule,
wherein the at least one control system further comprises:
a thrust vector control system configured to control a direction of thrust of the at least one engine;
a main propulsion system configured to control tankage for the at least one engine;
a reaction control system configured to control a yaw and pitch of the vehicle; and
a roll control system configured to control a roll of the vehicle; and
the vehicle management computer is configured to transmit flight commands to the consolidated propulsion controller, wherein the flight commands are independent of a configuration and state of the at least one engine, independent of a configuration and state of the thrust vector control system, independent of a configuration and state of the main propulsion system, independent of a configuration and state of the reaction control system, and independent of a configuration and state of the roll control system.

2. The vehicle of claim 1, wherein the consolidated propulsion controller receives data from each of the at least one engine, thrust vector control system, main propulsion system, reaction control system, and roll control system via the first virtual backplane and processes the received data to control a propulsion of the vehicle based upon the received data and the received flight commands.

3. The vehicle of claim 1, where the consolidated propulsion controller comprises a processor independent of the processor of the vehicle management computer.

4. The vehicle of claim 1, wherein the consolidated propulsion controller is included in a time and space partition within the processor of the vehicle management computer.

5. The vehicle of claim 1, wherein the first virtual backplane comprises a time-triggered Ethernet bus.

6. The vehicle of claim 1, wherein the first virtual backplane comprises a switch.

7. The vehicle of claim 1, further comprising a second virtual backplane, wherein the second virtual backplane is independent of the first virtual backplane and is communicatively coupled to the vehicle management computer, consolidated propulsion controller, at least one engine and at least one control system, wherein the vehicle management computer, consolidated propulsion controller, at least one engine and at least one control system are further configured to compare data received from the virtual backplane and the second virtual backplane and respond to the data only if the data received from the first and second virtual backplanes is identical.

8. A spacecraft having at least one engine, comprising:
a first virtual backplane;
a vehicle management computer communicatively coupled to the virtual backplane and having a first predetermined schedule, wherein the vehicle management computer is configured to add and consume data from the virtual backplane according to the first predetermined schedule;
a remote interface unit communicatively coupled to the at least one engine and configured to control the at least one engine, wherein the remote interface unit comprises at least one sensor for monitoring a health of the engine, wherein the remote interface unit is communicatively coupled to the virtual backplane and has a second predetermined schedule, wherein the remote interface unit is configured to add and consume data from the first virtual backplane according to the first predetermined schedule;
a consolidated propulsion controller communicatively coupled to the virtual backplane and having a third predetermined schedule different from the first and second predetermined schedules, wherein the consolidated propulsion controller is configured to add and consume data from the virtual backplane according to the third predetermined schedule; and
at least one control system communicatively coupled to the virtual backplane, each of the at least one control systems having a unique schedule, wherein each of the at least one control systems is configured to add and consume data from the first virtual backplane according to a respective unique schedule,
wherein the vehicle management computer is configured to transmit a flight command independent of a state and configuration of the at least one control system of the spacecraft to the consolidated propulsion controller by adding data the virtual backplane according to the first predetermined schedule, and
the consolidated propulsion controller is further configured to determine instructions for the at least one control system to execute the flight command and transmit the determined instructions to the at least one control system by adding data to the virtual backplane according to the third predetermined schedule.

9. The spacecraft of claim 8, wherein the second predetermined schedule includes a time to place sensor data from the sensor on the virtual backplane and the third predetermined schedule includes a time for the consolidated propulsion controller to consume the sensor data from the virtual backplane.

10. The spacecraft of claim 8, wherein the first predetermined schedule includes a time for the management computer to place flight commands on the virtual backplane and the third predetermined schedule includes a time for the consolidated propulsion controller to consume the flight commands from the virtual backplane.

11. The spacecraft of claim 8, wherein the consolidated propulsion controller is configured to process the flight commands, to create instructions for the remote interface unit and the control systems to execute the flight commands and to place the created instructions on the virtual backplane according to the third predetermined schedule.

12. The spacecraft of claim 8, wherein the at least one control system further comprises:
a thrust vector control system configured to control a direction of thrust of the at least one engine;
a main propulsion system configured to control tankage for the at least one engine;
a reaction control system configured to control a yaw and pitch of the spacecraft; and
a roll control system configured to control a roll of the spacecraft,
wherein each of the thrust vector control system, main propulsion system, reaction control system and roll control system has a unique schedule for adding data to the virtual backplane and for consuming data from the virtual backplane.

13. The spacecraft of claim 8, wherein the first virtual backplane comprises a time-triggered Ethernet bus.

14. The spacecraft of claim 8, wherein the first virtual backplane comprises a switch.

15. A method for controlling vehicle having a main flight computer and at least one engine, comprising:
receiving, by a consolidated propulsion controller, a flight command from the main flight computer via a virtual backplane, wherein the flight command is independent of a state and configuration of the vehicle;
determining, by the consolidated propulsion controller, instructions for the at least one engine and for at least one control system on the vehicle to execute the flight command; and
adding, by the consolidated propulsion controller, instructions for the at least one engine and for the at least one control system on the virtual backplane according to a predetermined schedule, and
adding, by the main flight computer, the flight command on the virtual backplane according to the predetermined schedule,
wherein the flight command is independent of the number of engines on the vehicle and the state and health of each of the at least one control systems.

16. The method of claim 15, further comprising:
adding, by the at least one control system, data including a state and health of the at least one control system on the virtual backplane according to the predetermined schedule;
receiving, by the consolidated propulsion controller, the data according to the predetermined schedule
wherein the determining further comprises determining instructions for the at least one engine and for at least one control system on the vehicle to execute the flight command based upon the received data.

17. The method of claim 16, wherein the determining further comprises modifying the instructions for the at least one engine and for at least one control system on the vehicle to execute the flight command based upon the received data.

* * * * *